United States Patent
Vandewall et al.

(10) Patent No.: US 10,775,793 B2
(45) Date of Patent: Sep. 15, 2020

(54) SYSTEMS AND METHODS FOR IN-FLIGHT CREW ASSISTANCE

(71) Applicant: The Boeing Company, Chicago, IL (US)

(72) Inventors: Cynthia Anne Vandewall, Snohomish, WA (US); Ming Tang, Mason, OH (US); Bradley Young, Cincinnatti, OH (US); Zea Zhou Qyang Zhan, Cincinnatti, OH (US); Adriana G. Navarro-Sainz, Cincinnatti, OH (US); Tiaoling Wang, Cincinnatti, OH (US); Blake Lane, Cincinnatti, OH (US)

(73) Assignee: THE BOEING COMPANY, Chicago, IL (US)

( * ) Notice: Subject to any disclaimer, the term of this patent is extended or adjusted under 35 U.S.C. 154(b) by 0 days.

(21) Appl. No.: 15/852,189

(22) Filed: Dec. 22, 2017

(65) Prior Publication Data
US 2019/0196475 A1  Jun. 27, 2019

(51) Int. Cl.
| | |
|---|---|
| *G05D 1/02* | (2020.01) |
| *B64D 11/00* | (2006.01) |
| *B65F 1/14* | (2006.01) |
| *G01C 21/36* | (2006.01) |
| *A47B 31/06* | (2006.01) |
| *B60B 19/12* | (2006.01) |

(52) U.S. Cl.
CPC ........... *G05D 1/0202* (2013.01); *B64D 11/00* (2013.01); *B64D 11/0007* (2013.01);
(Continued)

(58) Field of Classification Search
CPC .... G05D 1/0202; G05D 1/0212; B64D 11/00; B64D 11/0007; B65F 1/1405;
(Continued)

(56) References Cited

U.S. PATENT DOCUMENTS

| | | |
|---|---|---|
| 3,179,208 A | 4/1965 | Umanoff |
| 5,159,994 A | 11/1992 | Luria |
| (Continued) | | |

FOREIGN PATENT DOCUMENTS

| | | |
|---|---|---|
| DE | 202004020288 U1 | 4/2005 |
| DE | 202017103847 U1 | 7/2017 |
| (Continued) | | |

OTHER PUBLICATIONS

Extended European Search Report dated May 17, 2019 for corresponding European Application No. 18210645.0.

*Primary Examiner* — Paula L Schneider
(74) *Attorney, Agent, or Firm* — Joseph F. Harding; The Small Patent Law Group LLC

(57) ABSTRACT

A robot system is provided that is configured for use on-board a vehicle during a trip of the vehicle. The vehicle includes a cabin. The robot system includes a body, a transportation system, a communication link, an interaction system, and a control system. The transportation system is coupled to the body and configured to move the body through at least a portion of the cabin. The communication link is configured to receive trip information. The interaction system is configured to interact with at least one of a passenger or a crew member disposed within the cabin during trip. The control system is configured to operate the robot system to perform a crew assistance task during the use of the vehicle responsive to at least one of the trip information or information received from the at least one of the passenger or crew member.

20 Claims, 5 Drawing Sheets

(52) U.S. Cl.
CPC .......... *B65F 1/1405* (2013.01); *B65F 1/1473* (2013.01); *G01C 21/3667* (2013.01); *A47B 31/06* (2013.01); *B60B 19/12* (2013.01); *B62B 2202/67* (2013.01); *G05D 1/0212* (2013.01)

(58) Field of Classification Search
CPC ... B65F 1/1473; G01C 21/3667; B60B 19/12; A47B 31/06; B62B 2202/67
USPC .......................................................... 701/15
See application file for complete search history.

(56) References Cited

U.S. PATENT DOCUMENTS

| | | | |
|---|---|---|---|
| 2003/0160706 A1* | 8/2003 | Endress | B64D 11/0015 340/945 |
| 2007/0192910 A1* | 8/2007 | Vu | B25J 5/007 700/245 |
| 2014/0222206 A1* | 8/2014 | Mead | B25J 9/1697 700/259 |
| 2015/0014481 A1 | 1/2015 | Vandewall et al. | |
| 2017/0011580 A1* | 1/2017 | Huang | G06Q 10/30 |
| 2018/0001474 A1* | 1/2018 | Sinyavskiy | B25J 5/007 |
| 2018/0089622 A1* | 3/2018 | Burch, V | G06K 7/1413 |
| 2018/0329617 A1* | 11/2018 | Jones | G06F 3/04847 |
| 2019/0004540 A1* | 1/2019 | Zybala | H02J 50/10 |
| 2019/0009910 A1* | 1/2019 | Bates | B65F 1/1468 |
| 2019/0023334 A1* | 1/2019 | Akin | B62D 55/10 |
| 2019/0143872 A1* | 5/2019 | Gil | B60P 1/4421 |

FOREIGN PATENT DOCUMENTS

| | | |
|---|---|---|
| DE | 102017201187 A1 | 7/2018 |
| WO | 2015049058 A1 | 4/2015 |

* cited by examiner

SYSTEMS AND METHODS FOR IN-FLIGHT CREW ASSISTANCE

FIELD OF EMBODIMENTS OF THE DISCLOSURE

Embodiments of the present disclosure generally relate to systems and methods for performing tasks to assist crew and/or improve customer service, safety, and/or convenience during a trip performed by a vehicle.

BACKGROUND OF THE DISCLOSURE

A vehicle (such as an aircraft) may be used to transport a number of passengers as part of a trip. During the trip, various procedures may be performed for the passengers. Depending on the number of passengers, the number of procedures that need to be performed, and/or the complexity of the procedures to be performed, it may become challenging for crew members working in the vehicle during the trip to perform all of the tasks as quickly or completely as may be desired. Additionally, during the trip, various events may arise that provide additional challenges to crew members. For example, performing procedures relative to medical emergencies may be difficult and/or stressful.

SUMMARY OF THE DISCLOSURE

Accordingly, improved performance of tasks during a trip is provided in various embodiments disclosed herein.

Certain embodiments of the present disclosure provide a robot system that is configured for use on-board a vehicle during a trip of the vehicle. The vehicle includes a cabin having a usage area and a storage area. The robot system includes a body, a transportation system, a communication link, an interaction system, and a control system. The transportation system is coupled to the body and configured to move the body through at least a portion of the cabin during at least a portion of the trip. The communication link is configured to receive trip information. The interaction system is configured to interact with at least one of a passenger or a crew member disposed within the cabin during trip. The control system is configured to operate the robot system to perform a crew assistance task during the use of the vehicle responsive to at least one of the trip information or information received from the at least one of the passenger or crew member.

Certain embodiments of the present disclosure provide a robot system is provided that is configured for use on-board a vehicle including a cabin during a trip. The robot system includes a body, a transportation system, an interaction system, and a control system. The transportation system is coupled to the body and is configured to move the body through at least a portion of the cabin. The interaction system is configured to interact with at least one of a passenger or a crew member disposed within the cabin during the trip. The control system is configured to operate the robot system to perform a medical crew assistance task during the trip responsive to at least one of remote information acquired from a source disposed remote from the vehicle or information received from the at least one of the passenger or crew member.

Certain embodiments of the present disclosure provide a robot system is provided that is configured for use on-board a vehicle during a trip. The vehicle includes a cabin having a usage area and a storage area. The robot system includes a body having a receptacle, with the receptacle configured to contain trash. The transportation system is coupled to the body, and is configured to move the body through at least a portion of the cabin. The communication link is configured to receive trip information. The interaction system is configured to interact with at least one of a passenger or a crew member disposed within the cabin during the trip. The control system is configured to operate the robot system to perform a trash removal task during the trip responsive to at least one of the trip information or information received from the at least one of the passenger or crew member.

DETAILED DESCRIPTION OF THE DISCLOSURE

Figure 1:
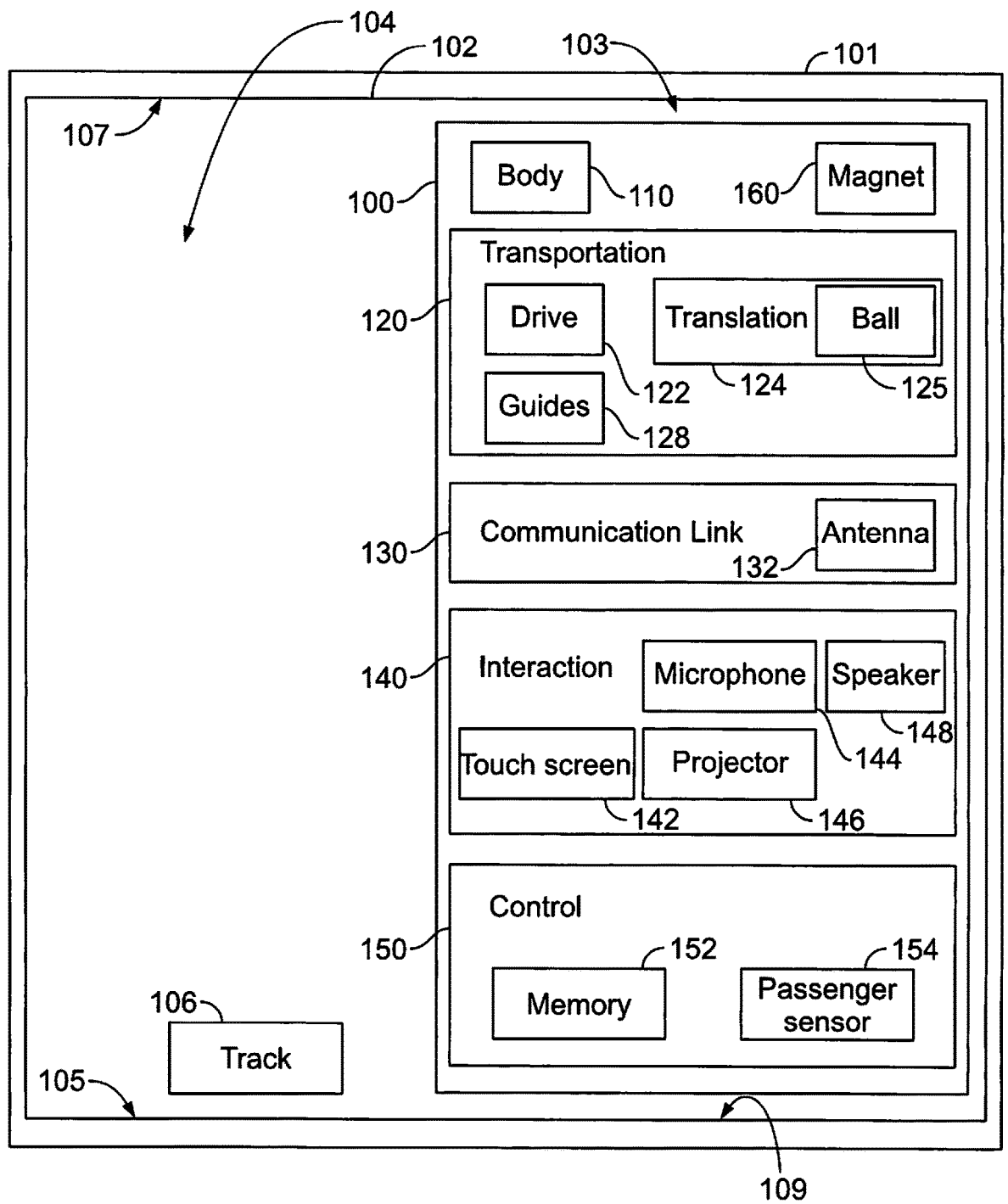
FIG. 1 provides a schematic block diagram of identification robot system, according to an embodiment of the present disclosure.

The foregoing summary, as well as the following detailed description of certain embodiments will be better understood when read in conjunction with the appended drawings. As used herein, an element or step recited in the singular and preceded by the word "a" or "an" should be understood as not necessarily excluding the plural of the elements or steps. Further, references to "one embodiment" are not intended to be interpreted as excluding the existence of additional embodiments that also incorporate the recited features. Moreover, unless explicitly stated to the contrary, embodiments "comprising" or "having" an element or a plurality of elements having a particular property may include additional elements not having that property.

Embodiments of the present disclosure provide systems and methods for providing robotic assistance in performing tasks during a trip of a vehicle (e.g., during a flight of an aircraft). Various embodiments provide a robot system (e.g., robotic assistant) that assists crew members in dealing with stress, communication, and procedures to be performed aboard a flight, for example in connection with medical emergencies.

It may be noted that challenges regarding medical emergencies may result from a lack of communication and/or information, or the difficulty of accessing medical information and/or accessing medical practitioners or other resources for consultation. By providing improved access to information and/or guidance, various embodiments help keep crew members calm and aware of steps to be performed during an in-flight event (e.g., medical emergency). Various embodiments help crew members efficiently communicate and attend to a passenger's emergency medical needs, and allow for guidance from a medical practitioner located remotely from the vehicle. Further still, robot system in various embodiments communicate with the pilot and/or ground medical team to keep them in the loop regarding developments, thereby helping improve medical services provided after the trip as well.

Various embodiments provide a robotic assistant for performing tasks on-board a vehicle. For example, the robotic assistant may roll on a gyroscopic ball, allowing for relatively quick movement and stable balance. The robotic assistant may acquire medical information from a patient in various embodiments. For example, a crew member may place biometric bracelet on the passenger with which the robotic assistant collects medical data. The robotic assistant may then display the passenger's vital signs, and/or display a video call with one or more medical professionals remote from the vehicle (e.g., practitioners located on the ground may be on the call with a crew member on-board an aircraft during a flight). In various embodiments, the robotic assistant may also include a projection device that may be utilized to provide projected guided instructions (e.g., projected on the passenger experiencing the medical emergency) to guide a crew member through medical procedures such as cardio pulmonary resuscitation (CPR). Accordingly, various embodiments provide for improved provision of medical services during a flight, which may reduce flight diversions and improve passenger safety. It may be noted that in various embodiments the robotic assistant may perform other tasks (e.g., collection of trash from passengers) additionally or alternatively to performing medical tasks. As another example, the robotic assistant may be used to provide safety alerts and/or assistance, for example, to alert passengers of turbulence, allowing crew members to be securely seated with seatbelts.

FIG. 1 provides a schematic view of a robot system 100. The system 100 is generally configured to perform various tasks to assist a flight crew during a flight of an aircraft. The depicted robot system 100 is configured to be used on-board a vehicle during use of the vehicle (e.g., during a trip performed with the vehicle). For example, in the illustrated embodiment, the robot system 100 is configured to be used on-board an aircraft 101 during a flight. It may be noted that the aircraft 101 is an example of a vehicle with which the robot system 100 may be used. In alternate embodiments, the robot system 100 may be used in connection with a different vehicle, such as a ship or other water craft, or, as another example, in connection with a land-based vehicle such as a bus or train. As seen in FIG. 1, the aircraft 101 includes a cabin 102, with the cabin including a usage area 103 and a storage area 104. The usage area 103, for example, may include an area for seating of passenger and/or crew. The storage area 104 is generally configured for storage of one or more robots used for in-flight crew assistance, and may be used to store additional equipment. The storage area 104, for example, may include a predetermined location on the floor of the cabin 102, one or more storage bins disposed on the floor, and/or one or more storage bins or racks disposed on a wall or ceiling of the cabin 102. It may be noted that while the storage area 104 may be located separately from the usage area 103 in some embodiments, or, alternatively or additionally, the storage area 104 may be disposed with the usage area 103. Generally, one or more robots of the robot system 100 may be utilized within the usage area 103 to perform various tasks for passengers and/or or crew members, and be stored in the storage area 104 when not in use. For example, one or more robots may be utilized in the usage area 103 when the aircraft 101 is cruising, but secured and stored in the storage area 104 during take-off and landing.

As seen in FIG. 1, the depicted robot system 100 includes a body 110, a transportation system 120, a communication link 130, an interaction system 140, and a control system 150. Generally, the transportation system 120 is coupled to the body 110, and is configured to move the body 110 through at least a portion of the cabin 102 (e.g., between the usage area 103 and the storage area 104; around an aisle and/or other portion of the usage area 103). The communication link 130 is configured to receive trip information (e.g., flight information), and the interaction system 140 is configured to interact with at least one of a passenger or a crew member disposed within the cabin 102 during the use of the vehicle (e.g., during a flight). The control system 150 is configured to operate the robot system 100 (e.g., operate the transportation system 120 and/or the interaction system 140) to perform a crew assistance task during the trip. The crew assistance task is performed responsive to at least one of the trip information or information that is received from at least one of a passenger or crew member.

Figure 4:
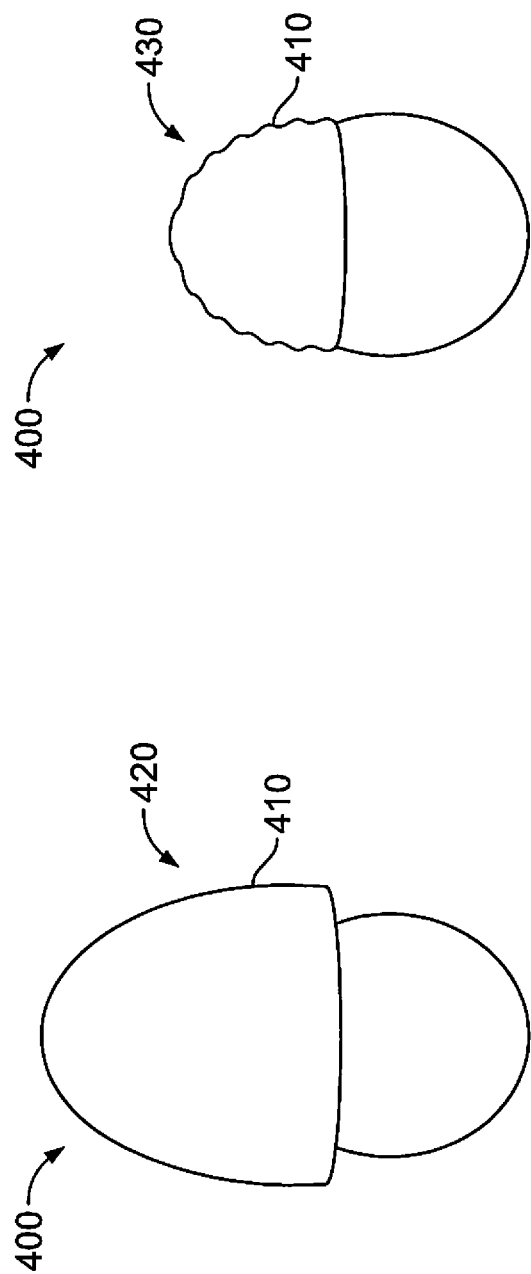
FIG. 4A illustrates an example robot system with a compressible body in an expanded state, according to an embodiment of the present disclosure.
FIG. 4B illustrates the robot system of FIG. 4A with the compressible body in a compressed state.

It may be noted that the body 110 may include one or more portions that are articulable separately from other portions (e.g. a head portion that may pivot or tilt with respect to other portions of the body 110 allowing the head portion to be oriented toward a passenger or crew member without requiring the entire body 110 to be oriented toward the passenger or crew member), or may include one or more appendages or arms that may be used to manipulate or grasp objects. It may be noted than in various embodiments, the body 110 is configured to be compressible between an expanded state and a compressed state. FIGS. 4A and 4B illustrate an example robot system 400 with a compressible body 410. It may be noted that one or more aspects of other robot systems discussed herein (e.g., robot system 100, robot system 200) may be incorporated into or used in connection with the robot system 400, or vice versa. In FIG. 4A, the body 410 is in an expanded state 420, and in FIG. 4B the body 410 is in a compressed state 430. For example, the body 410 may include one or more telescoping and/or nested portions. The control system 150 may then direct one or more actuators associated with the telescoping or nested portions to move those portions between the expanded state 420 and the compressed state 430. As another example, the body 410 may inflatable, with one or more valves and/or air supplies directed by the control system 150 to move the body 410 between the expanded state 420 and the compressed state 430. In some embodiments, the body 410 may be placed in the expanded state 420 to perform one or more crew assistance tasks, and placed in the compressed state 430 to take up less space when stored. As another example, in some embodiments, the body 410 may be placed in the expanded state 420 to perform one or more crew assistance tasks, and placed in the compressed state 430 to provide additional room to allow passage of a crew member or passenger walking past the robot system 100. As one more example, the body 410 may be placed in the expanded state 420 to collect trash, and placed in the compressed state 430 to compress trash collected within the body 410.

Figure 2:
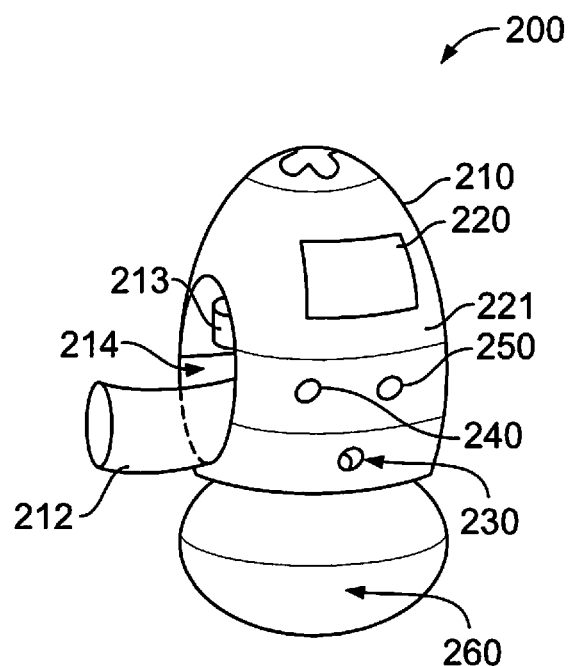
FIG. 2 illustrates an example robot system, according to an embodiment of the present disclosure.

Returning to FIG. 1, the body 110 in various embodiments is configured to house various components of the robot system 100 (e.g., sensors, processors, portions of the transportation system 120, or the like), for storage of equipment and/or trash, and/or to provide a display surface. For example, FIG. 2 depicts an example robot system 200 having a body 210. The body 210 includes a hatch 212 providing access to compartment 214. It may be noted that aspects of the robot system 200 may be employed in connection with and/or incorporated into the robot system 100, or vice versa.

Compartment 214, for example, may be used to hold medical supplies or other equipment. Additionally or alternatively, compartment 214 may be used as a receptacle to hold trash. In some embodiments, the robot system 200 includes a compacter 213 disposed within the body 210, and configured to compact trash disposed in the receptacle (e.g., compartment 214). Further additionally or alternatively, the hatch 212, and/or an additional hatch (or hatches) may also provide access to install, repair, or replace one or more components of the robot system 100 disposed within the body 110.

The body 210 in various embodiments is configured for mounting of various components of the robot system 200 (e.g., aspects of the transportation system 120, communication link 130, interaction system 140, and/or control system 150). Components of the robot system 200 may be mounted internally within the body 210 and/or externally on an outer surface of the body 210. For example, a screen 220 is provided on an external surface 221 of the body 210. The screen 220 in various embodiments is a touchscreen that allows for user input in addition to providing a display. As another example, in the illustrated embodiment, a projector 230 is disposed on the external surface 221 of the body 210. The projector 230 in various embodiments is configured to provide a holographic or 3-dimensional display. The depicted robot system 200 also includes a speaker 240 configured to provide audible information to a user (e.g., passenger or crew member), along with a microphone 250 to receive audible information from the user. It may be noted that additional equipment, such as a battery or other energy storage, one or more aspects of a drive mechanism for the transportation system, and/or a magnet for securing the body 210 in place may be mounted to the body 210. Further still, one or more aspects of the control system, such as a processing unit (or units) may be disposed within the body 210. As one more example, an antenna or other communication device may be mounted to the body 210. For instance, information may be received wirelessly by the robot system 200 via the antenna. As another example, one or more aspects of the control system 150 may be disposed off-board of the body 210, with commands provided remotely to the various components of the robot system 200 disposed on or in the body 210 by an off-board processing system.

Returning to FIG. 1, the transportation system 120 is coupled to the body 110. The transportation system 120 is configured to move the body 110 through at least a portion of the cabin 102. In various embodiments, the transportation system 120 is configured to move the body 110 along at least one of a floor, wall, or ceiling. The transportation system 120 depicted in FIG. 1 includes a drive unit 122 that drives or actuates a translation system 124 to move the body 110 of the robot system 100. In various embodiments, the translation system 124 may include one or more of wheels, tracks, or rollers (e.g., a gyroscopic ball). Various aspects of the translation system 120 may be configured to translate across a floor in various embodiments. Additionally or alternatively, aspects of the translation system 124 may be configured to cooperate with a network of tracks to move the body 110 along one or more tracks or rails disposed along one or more of a floor, wall, or ceiling.

In some embodiments, the drive unit 122 includes a motor along with an output shaft. The output shaft may drive one or more wheels, for example via gears. The drive unit 122 and/or translation system 124 may also include one or more brakes to slow or stop the body 110 after the body 110 is at or approaching a desired location. In some embodiments, the transportation system 120 (e.g., the translation system 124 of the transportation system 120) includes a gyroscopic ball 125 configured for rolling the robot system 100 along a floor 105 of the cabin 102. For the example embodiment depicted in FIG. 2, the robot system 200 includes a roller ball 260 actuated by a drive unit housed within the body 210. The roller ball 260 provides an example of a component that may define or form a part of the translation system 124 of the embodiment depicted in FIG. 1. The roller ball 260 provides for efficient movement of the body 210 in any direction along a floor (e.g., floor 105 of the cabin 102).

Further, when used in cooperation with tracks and/or guides disposed along a ceiling or wall of the cabin, the roller ball 260 may also be used to propel the body 210 along a ceiling or wall in cooperation with the tracks and/or guides. Accordingly, in various embodiments, the transportation system 120 is configured to cooperate with a track network 106 disposed in the cabin 102. For example, the transportation system 120 in some embodiments includes guides 128 or other features that are configured to cooperate with the track network 106. For example, a rail or track extending from the floor 105 or ceiling 107 of the cabin 102 may be accepted by the guides 128, and the translation system 124 configured to interact with the floor 105 or ceiling 107 and/or rails or tracks of the track network 106 to propel the robot system 100 along the track network. In some embodiments, the track network 106 is disposed along the ceiling 107 of the cabin 102. Use of a track network 106 along the ceiling 107 in various embodiments provides for convenient access to locations that may not be readily reachable along the floor 105, and/or provides for movement of the body 110 without taking up space along an aisle or other part of the floor 105. It may be noted that the track network 106 may be configured for use for additional purposes in addition to use with the transportation system 120. For example, the track network 106 may include rails that are used in connection with an environmental control system (e.g., with ducting or conduits inside of the rails for distributing air throughout the cabin 102).

Figure 3:
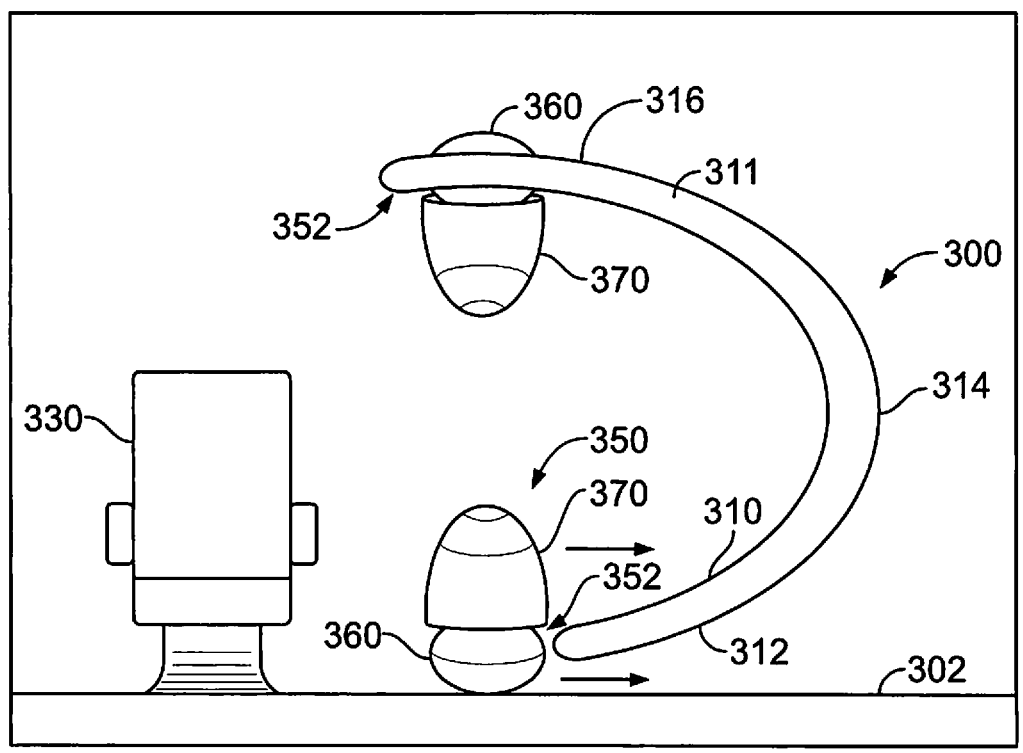
FIG. 3 depicts an example track network and a robot system, according to an embodiment of the present disclosure.

In some embodiments, the track network 106 may extend along both the floor 105 and the ceiling 107. For example, FIG. 3 depicts an example track network 300 and a robot system 350 formed in accordance with an embodiment. It may be noted that one or more aspects of other robot systems discussed herein (e.g., robot system 100, robot system 200) may be incorporated into or used in conjunction with the robot system 350, or vice versa. As seen in FIG. 3, the track network 300 includes a track 310 having a floor portion 312, a wall portion 314, and a ceiling portion 316. In the illustrated embodiment, the robot system 350 includes a roller ball 360 that allows the robot system 350 to move freely about the floor 302, and also to move along the track 310. The track 310 in various embodiments two beams 311 spaced a lateral distance apart to accept the robot system 350. For example, a space 352 between the roller ball 360 and a body 370 of the robot system 350 may be sized to accept the beams of the track 310, such that the roller ball 360 may cooperate with the track 310 to propel the robot system along the track 310. In the illustrated embodiment, the track 310 is disposed proximate a seat 330, such that the robot system 350 may be positioned along the ceiling portion 316 of the track 310 to provide an overhead message to a passenger sitting in the seat 330. Additionally or alternatively, for example, the ceiling portion 316 may be used for storage of the robot system 350 and/or to allow for movement of the robot system 350 throughout a cabin while not occupying space along the floor 302.

With continued reference to FIG. 1, the communication link 130 is configured to receive trip information. In the illustrated embodiment, the trip information includes flight information for a flight being performed by the aircraft 101. In alternate embodiments, the communication link 130 may be configured to receive trip information corresponding to a trip performed on a different type of vehicle with which the robot system 100 is disposed, such as a train or a bus. The flight information in various embodiments is utilized by the control system 150 to operate the robot system 100 (e.g., to perform a crew assistance task). In the illustrated embodiment, the communication link includes an antenna 132. The antenna 132, for example, may receive information wirelessly from a source within the aircraft 101. Alternatively or additionally, the antenna 312 may be utilized to receive information from a source on the ground or otherwise off-board of the aircraft 101. Flight information may be automatically or autonomously received, and/or received via a manual input (e.g., an input provided by a crew member). Examples of flight information include information regarding a status of flight (e.g., loading or unloading, taxiing on runway, take-off, ascent, cruising, descent, landing), information regarding performance of flight (e.g., presence or absence of turbulence, airspeed, percentage of flight completed and/or time remaining on flight, deviations from planned trip, time to arrival at destination, weather encountered during flight), information regarding passengers (e.g., identification of passengers, current location of one or more passengers, identification of seat(s) associated with one or more passengers, location of baggage pick up sites), information regarding crew (e.g., identification of crew, location of one or more crew members), connecting flights (e.g., time remaining to board one or more connecting flights scheduled for corresponding passengers, on-time or delayed status for connection flights). Accordingly, in various embodiments, the communication link 130 allows the robot system 100 to be effectively connected with other aspects of the aircraft 101, and to act cooperatively with other aspects of the aircraft 101 provide a smart cabin.

In various embodiments, the control system 150 operates the robot system 100 responsive to the flight information and/or the receipt thereof. By way of example, a particular task may be performed responsive to receiving a particular type of flight information (e.g., information regarding connecting flights and/or baggage pickup may be announced and/or displayed responsive to receiving flight information corresponding to an impending descent or landing). As another example, a particular task may be prevented from being performed responsive to receiving a particular type of flight information (e.g., food and/or drink service may be prohibited during turbulence, take-off, landing, climbing, or descent). Moreover, in various embodiments, the task performed may be targeted toward or tailored for a particular passenger or group of passengers (e.g., based on flight information describing the identification and/or location of one or more passengers).

The interaction system 140 is configured to interact with at least one of a passenger or a crew member disposed within the cabin 102 during the flight. For example, the interaction system 140 may be used to provide information, instruction, and/or guidance to one or more passengers and/or one or more crew. Alternatively or additionally, for example, the interaction system 140 may be used to receive information or a request from a passenger, and/or to receive information, a request, or a command from a crew member. Information acquired via the interaction system 140 from one or more passengers and/or crew members may be used by the control system 150 to operate the robot system 100 (e.g., to perform a crew assistance task). The information acquired via the interaction system 140 may be used in connection with flight information (e.g., information acquired via the communication link 130), or may be used independently of flight information.

Generally, the interaction system 140 includes one or more aspects or components operably coupled with the control system 150 and configured for communicating or interacting with passengers and/or crew members. Interaction with passengers and/or crew members may be performed in various embodiments visually (e.g., display or projection), tactilely (e.g., receiving a manual input via touchscreen, keyboard, or other input device), or audibly. Aspects of the interaction system 140 may be mounted, for example, on an exterior surface of the body 110. In the illustrated embodiment, the interaction system 140 includes a touch screen 142, a microphone 144, a projector 146, and a speaker 148.

The touch screen 142 is configured to provide a visual display, such as status of connecting flights, time of arrival, available options (such as food or drink options), information and/or guidance regarding available equipment (e.g., headphones, entertainment equipment such as video screens), or the like. Additionally, the touch screen 142 may display a keyboard or other input pattern allowing for the entry of a request, command, or information from a passenger or crew member (e.g., a request for a food or drink item from a passenger, a command from a crew member to perform a given task, entry of an identification code or other authorization input identifying a passenger or crew member and/or providing clearance for performance of a task requested by the passenger or crew member).

The microphone 144 is configured to receive audible information (including requests and/or commands) from one or more crew members and/or one or more passengers. The projector 146 is configured to provide a visual display, for example a holographic projection display. The projector 146 may be adjustable to project on a convenient surface, or toward a region of interest. For example, if the projector 146 is being used to provide information and/or guidance regarding a specific task to be performed by a crew member (e.g., a medical task), the projector 146 may be controlled to provide the display at a location proximate to where the task is to be performed. The projector 146 may also be used to provide information such as status of connecting flights, time of arrival, available options (such as food or drink options), information and/or guidance regarding available equipment (e.g., headphones, entertainment equipment such as video screens), or the like.

The speaker 148 is configured to provide an audible announcement, which may include information such as status of connecting flights, time of arrival, available options (such as food or drink options), information and/or guidance regarding available equipment (e.g., headphones, entertainment equipment such as video screens), information and/or guidance regarding safety (e.g., status of turbulence, seat belt reminders or instruction) or the like. It may be noted that, in various embodiments, the robot system 100 is configured to autonomously display a flight announcement (e.g., via touch screen 142, projector 146) corresponding to flight information responsive to receiving the flight information. For example, the flight information may include updated or changed status of a subsequent connecting flight for which one or more passengers within the cabin 104 are scheduled to be on. The robot system 100 may display the changed status of the connecting flight to the one or more passengers autonomously responsive to receiving the information, to provide a quick, convenient update to the one or more passengers. It may be noted that the screen 220, projector 230, speaker 240, and microphone 250 depicted in FIG. 2 also provide examples of aspects of an interaction system 140 in accordance with various embodiments.

The control system 150 is configured to operate the robot system 100, for example to perform a crew assistance task during a trip (e.g., a flight of the aircraft 101). The crew assistance task is performed in various embodiments responsive to trip information (e.g., flight information) as discussed herein acquired via the communication link 130 and/or information received from one or more passengers and/or one or more crew members (e.g., via the interaction system 140). A task may be performed responsive to received information, for example, by being performed as a result of receipt of the information. As another example, a task may be scheduled as a result of receipt of the information. As one more example, a previously scheduled and/or defined task may be modified and/or re-scheduled as a result of receipt of the information. The control system 150 in various embodiments includes one or more processors along with one or more memories. It may be noted that the control system 150 may be entirely disposed within the body 110, may be located externally of the body 150 (e.g., as part of an on-board processing system disposed in the cabin 102, or as part of a ground-based processing system communicatively coupled with other aspects of the robot system 100 via the communication link 130), or a combination thereof.

Generally, the control system 150 receives information from one or more sources and utilizes the information to determine a task or tasks to be performed by the robot system 100, and provides control signals corresponding to the determined task or tasks to the robot system 100 to cause the robot system 100 to perform the task or tasks. The depicted control system 150 is coupled to the communication link 130, and acquires the trip information (e.g., flight information) via the communication link 130. Communicably coupling the control system 150 with on-board and/or off-board systems or sub-systems increases the connectivity of the robot system 100 and/or the cabin 102, allowing for a "connected cabin," allowing the robot system 100 to utilize information from a variety of source for convenient, efficient, and reliable operation as well as providing for the robot system 100 to perform tasks consistently with actions taken by other systems or subsystems of the aircraft 101. The depicted control system 150 is also coupled to the interaction system 140, and acquires information from passengers and/or crew members via the interaction system 140 (e.g., via touchscreen 142 and/or microphone 144). The control system 150 is also configured to provide control signals to the interaction system 140 to provide a display and/or audible messages to passengers and/or crew members (e.g., via touchscreen 142, projector 146, and/or speaker 148). Also, the depicted control system 150 is coupled to the transportation system 120, and provides control signals to the transportation system 120, for example to position the body 110 in a location to perform a task, to move the body 110 from a storage location to a usage location, or the like. The robot system 100 may also include one or more arms or actuators (not shown in FIG. 1) which are also controlled by the control system 150. It may be noted that in various embodiments, the robot system 100 (e.g., control system 150) may aggregate data from a number of sources and/or trips, analyze the data for patterns, and perform predictive modeling, for example to inform the crew of needed information, or, as another example, to personalize or tailor services for passengers. In various embodiments, autonomous or machine learning may be employed by the control system 150 to increase operational efficiency.

As seen in FIG. 1, the control system 150 includes a memory 152 that stores instructions for directing the control system 150 (e.g., one or more processors of the control system 150), for example, to perform tasks or processes discussed herein (or aspects thereof). Accordingly, the control system 150 may be understood as being specifically configured to or programmed to perform tasks or processes discussed herein (or aspects thereof). The memory 152 in various embodiments also stores information acquired during previous trips (e.g., flights). For example, information from previous trips may be used to determine patterns or probabilities that may be used to determine upcoming tasks. For example, the amount of time needed to collect trash for a given route and number of passengers (or similar lengths of routes and number of passengers) may be collected over time and used to determine an estimated amount of time needed to perform a current trash collection task for a particular trip being performed.

Generally, the robot system 100, under the control of the control system 150, performs one or more crew assistance tasks during a trip responsive to trip information and/or information acquired from passengers and/or crew members. The information may be acquired autonomously, or acquired via user input, or a combination thereof. For example, responsive to trip information acquired via the communication link 130, the control system 130 may perform an initial task to acquire information manually from a passenger (or crew member) to perform a subsequent task. For instance, the control system 150 may autonomously acquire trip information indicating that a time of the trip desirable for food or drink delivery has been (or is about to be reached). The control system 150 may then control the transportation system 120 to perform an initial task and propel the body 110 proximate to a passenger. When the body 110 is proximate to the passenger, the control system 150 may then control the interaction system 140 to perform an additional task and interact with the passenger to determine if the passenger has a food or drink order the passenger would like to place. Using the information acquired from the passenger, if the passenger had an order, the control system 150 may then perform an additional task and control the robot system 150 to inform a crew member (e.g., remotely via the communication link 130 or directly via the interaction system 140) who will fulfill the order, or the control system 150 may control the transportation system 120 and body 110 to retrieve the order and deliver the order to the passenger.

Additionally or alternatively to flight information, information from a passenger sensor may be used by the control system 150 in determining and/or performing crew assistance tasks. For example, the depicted robot system 100 includes a passenger sensor 154. The control system 150 is configured to control the robot system 100 responsive to an input received via the passenger sensor 154. For example, the passenger sensor 154 in various embodiments may include a microphone located off-board the body 110 and in the vicinity of one or more passengers. (As discussed herein, a microphone may also be disposed on the body 110.) The control system 150 may be communicably coupled to the passenger sensor 154 (e.g., microphone) and receive auditory inputs (e.g., spoken requests) from one or more passengers via the passenger sensor 154, and perform one or more crew assistance tasks responsive to those auditory inputs. As another example, in various embodiments the passenger sensor 154 may include a motion and/or proximity sensor. The control system 150 may be configured to move the robot system 100 out of the path of a passenger or crew member responsive to detection of the passenger or crew member with the passenger sensor 154, and/or may control the robot system 100 to be oriented toward the passenger or crew member (e.g., to have a screen displaying a message oriented toward the passenger or crew member) responsive to detection of the passenger or crew member. As one more example, the passenger sensor 154 in various embodiments is configured to acquire medical information of a passenger during a trip. For example, the passenger sensor 154 may include a medical detector configured to sense one or more vital signs of a passenger. The control system 150 may then control the interaction system 140 to provide one or more informational messages or guidance messages based on the detected vital signs. Additionally or alternatively, the passenger sensor 154 may include a camera or other imaging device, and be utilized to obtain an image of a passenger that may be used by the control system 150 and/or a medical practitioner in communication with the robot system 100 in connection with diagnosing or evaluating a medical event.

The robot system 100 in various embodiments performs one or more of a variety of crew assistance tasks under the direction of the control system 150. For example, the control system 150 may control the robot system 100 to provide guidance or information to a crew member assisting a passenger experiencing a medical condition (e.g., responsive to an input from a crew member or passenger, or responsive to trip information including a detected or sensed medical condition). As another example, the control system 150 may control the robot system 100 to collect trash (e.g., responsive to flight information indicating a time of flight conducive to trash collection, or responsive to an input from a crew member or passenger). As one more example, the control system 150 may control the robot system 100 to display information (e.g., responsive to an input from a crew member or passenger, or responsive to flight information indicating a time of flight conducive to display of the information). For instance, at a predetermined time before arrival, the control system 150 may direct the interaction system 140 to provide information to one or more passengers regarding the status of connecting flights and/or information regarding baggage pickup.

In some embodiments, the robot system 100 is configured to perform a medical assistance task. For example, the robot system 100 may include the body 110, transportation system 120, interaction system 140, and control system 150, with the control system configured to operate the robot system 100 to perform a medical crew assistance task during the flight responsive to at least one of remote information acquired from a source disposed remote from the vehicle, or information received from the at least one of the passenger or crew member. It may be noted that information from the at least one of the passenger or crew member may be received directly (e.g., via a manual input on a touchscreen or vocal command provided to the interaction system 140), or indirectly (e.g., through flight information or from an on-board computing or communication system providing information to additional aspects of the vehicle). Examples of medical assistance tasks that may be performed in various embodiments include providing guidance or information regarding a medical event to a passenger or crew member, acquiring information (e.g., vital signs with a medical sensor; images with a camera or portable imaging devices), providing supplies (e.g., bandages, medication) for use in connection with the medical event, or providing information regarding the medical event to personnel remote from the cabin 102. In various embodiments, the robot system 100 may perform crew assistance tasks that include providing supplies and instructions. For example, for a passenger experiencing a cardiac event, the robot system 100 may be utilized to provide defibrillation equipment as well as guidance on how to use the equipment.

For example, a crew member may provide an alert or notice to the robot system 100 that a passenger is experiencing a medical event. The control system may then direct the transportation system 120 to move the body 110 to the vicinity of the passenger. Once there, the crew member may provide information to the robot system 100 via the interaction system 140. Collection of the information may be facilitated with prompts provided to the crew member via the interaction system 140. Additionally or alternatively, information may be collected by robot system 100 from the passenger (e.g., audible information provided by the passenger regarding the medical event, and/or information from a bracelet or other device worn by the passenger describing or corresponding to a medical event), or via a medical sensor (e.g., device for measuring temperature, blood pressure, cardiac or other signal, blood sugar, or the like). The information acquired may then be utilized by the control system 150 to determine further medical tasks to be performed, and/or provided to a medical practitioner for further analysis, with the medical practitioner then communicating with the robot system 100 to direct one or more additional medical tasks.

As discussed herein, the robot system 100, in connection with a medical event experienced by a passenger, may provide guidance corresponding to the medical crew assistance task via the interaction system 140. The guidance may be provided autonomously by the robot system 100, and/or may be provided in connection with a medical practitioner. For example, in some embodiments, the robot system 100 is disposed on an aircraft, and includes a communication link 130 that is operably coupled to connect the robot system 100 to a ground communication system. The robot system 100 is configured to collect medical information of the passenger, and to provide the medical information to off-board medical personnel via the ground communication system using the communication link 130. The off-board medical personnel may then utilize the provided information to determine an appropriate course of action, which may then be communicated to and implemented by the robot system 100. Accordingly, in various embodiments, the robot system 100 is configured to receive guidance from the off-board medical personnel via the communication link 130, and to perform one more medical crew assistance tasks responsive to receiving the guidance. By providing improved collaboration with off-board medical resources, the robot system 100 may interact with off-board sources of information to provide improved medical assistance compared to having to rely solely on on-board resources.

In some embodiments, the robot system 100 is configured to perform a trash removal task. For example, the control system 150 may be configured to perform a trash removal task during a trip (e.g., flight) responsive to at least one of the trip information (e.g., trip information acquired via the communication link 130) or information received from at least of a passenger or crew member (e.g., a request for trash removal). In some embodiments, the control system 150 is configured to operate the robot to perform the trash removal task responsive to a flight status. For example, the control system 150 may use the trip information to determine a time corresponding to an end of the trip (e.g., a predetermined time before a descent for landing is reached). When the predetermined is reached, the control system 150 may then autonomously direct the robot system 100 to collect trash from one or more passengers, and then move to the storage area 104 or other secure location before descent and landing.

It may be noted that the performance of one or more crew assistance tasks under the direction of the control system 150 may be targeted or directed toward a particular passenger (or crew member) or particular group of passengers (or crew member). The targeting or directing may be determined autonomously and/or using an input from one or more passengers or crew members. As an example of autonomous targeting, the control system 150 may direct the robot system 100 to perform a task (e.g., announcement of flight schedules, collection of trash) based on a time or stage of flight, or other information. As an example of targeting using input, the control system 150 may receive a notice from a crew member or a passenger, and perform a task for that particular crew member or passenger. For instance, a crew member may provide an alert to the robot system 100 that a passenger is experiencing a medical event. The control system 150 may then direct the robot system 100 toward the passenger to perform one or more tasks to assist in addressing the medical event. As another example, a passenger may provide an alert (either directly to the robot system 100 via remote communication, or indirectly to the robot system 100 via an additional on-board communication system) to the robot system 100 that the passenger would like to place a food or drink order, and/or has trash for collection.

Further, the targeting or directing may be determined based on flight information and/or based on information from one or more passengers or crew members. As an example of targeting based on flight information, the control system 150, based on flight information, may determine which passengers will be taking a particular connecting flight, and the control system 150 may then direct the transportation system 120 to guide the body 110 toward the passenger(s) of interest, and then direct the interaction system 140 to display information regarding the connecting flight (e.g., time of departure, departure gate) to the passenger(s) of interest. As an example of targeting based on information from one or more passengers or crew members, the robot system 100 may receive an alert or request to perform one or more crew assistance tasks (e.g., provide medical assistance, collect trash, display information) for a particular passenger or passengers, or a particular portion of the cabin 102. Then, the control system 150 may direct the transportation system 120 to guide the body 110 toward the passenger(s) and/or location of interest, and then direct the robot system 100 to perform one or more crew assistance tasks as discussed herein.

In various embodiments, the control system 150 is configured to secure the robot system 100 (e.g., the body 110) of the robot system 150 in place during at least a portion of a trip (e.g., flight). In some embodiments, the control system 150 may be configured to autonomously secure the robot system 150 in place responsive to flight information. As one example, the robot system 150 may move the body 110 between the usage area 103 and the storage area 104 responsive to flight information. The storage area 103 may be disposed in a location remote from passengers and/or crew, for example within a compartment of a galley. The robot system 100 may begin the trip (e.g., flight) in the storage area 104. Then, after take-off, when a cruising altitude has been reached and travel within the cabin 102 is deemed appropriate, the control system 150 may direct the robot system 150 to leave the storage area 104. Further, responsive to flight information indicating a descent (or other event during which travel throughout the cabin 102 is undesirable) is approaching, the control system 150 may direct the transportation system 120 to move the body 110 to the storage area 104, where the body 110 may be secured in place. Accordingly, the control system 150 in various embodiments is configured to autonomously secure the robot system 100 (e.g., the body 110 of the robot system 150) in place in the storage area 104 during at least one of take-off or landing.

Additionally or alternatively, the robot system 110 may be secured at a location other than the storage area 104 during a flight. For example, responsive to flight information indicating turbulence, the control system 150 may secure the body 110 in place at or near the current location of the body. In some embodiments, for example, the robot system 100 includes a magnet 160. Further, the floor 105 may include a magnetic portion 109 disposed within the usage area 103 of the cabin 102. The control system 150 may then secure the robot system 100 in place during a flight using the magnet 160 in cooperation with the magnetic portion 109 of the floor 105 (e.g., by using control signals to activate the magnet 160, or to de-activate the magnet 160 to release the robot system 100 from a secured position). Accordingly, the robot system 100 may be quickly secured in place without requiring a trip to the usage area 104 during a flight.

Utilizing one or more on-board and/or off-board processors, in various embodiments the control system 150 may utilize artificial intelligence or machine learning in connection with the performance of crew assistance tasks. For example, the control system 150 may analyze patterns of previous flights to determine an ideal or preferred time to collect trash and/or expected amounts of trash to be picked up, and control the robot system 100 to collect the trash accordingly. Additionally or alternatively, the control system 150, for example, may analyze patterns or relationships between food and/or drink orders place and the preferred time and/or expected amount of trash for collection, and control the robot system 100 to collect the trash accordingly. Similarly, patterns regarding other crew assistance tasks may also be accumulated and analyzed for use in determining and implementing crew assistance tasks by the control system 150.

Figure 5:
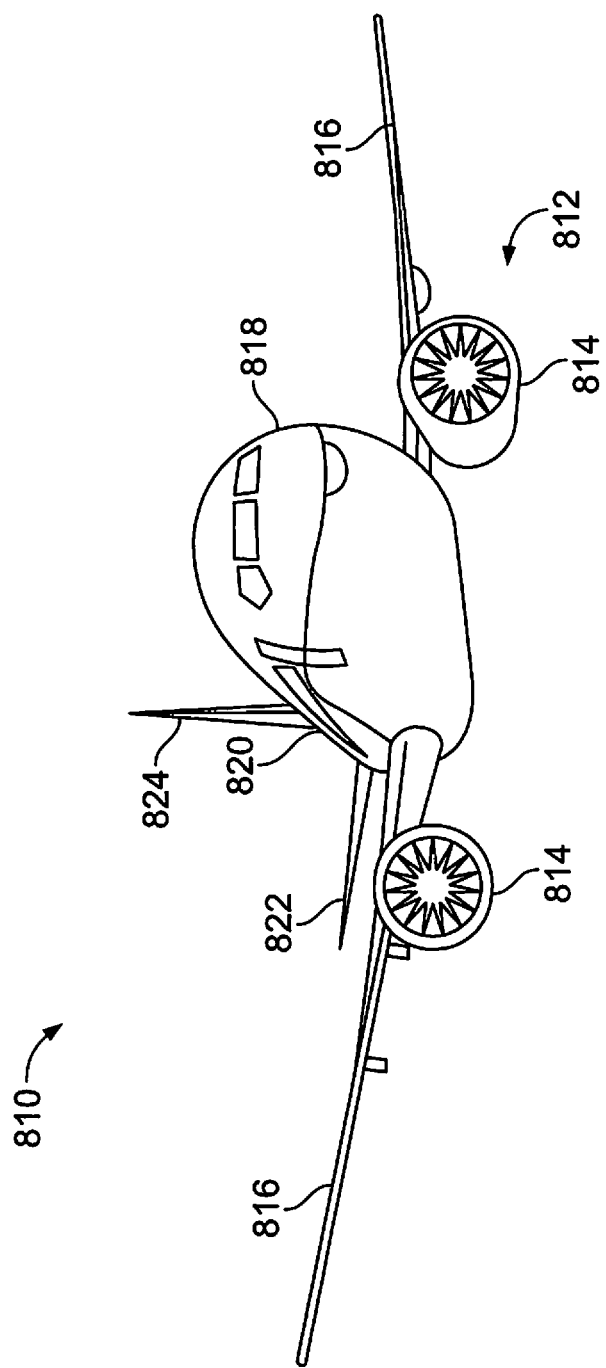
FIG. 5 illustrates a perspective front view of an aircraft, according to an embodiment of the present disclosure.

FIG. 5 illustrates a perspective front view of an aircraft 810, according to an embodiment of the present disclosure. The aircraft 810 is an example of a vehicle with which a robot system may be utilized. The aircraft 810 includes a propulsion system 812 that may include two turbofan engines 814, for example. Optionally, the propulsion system 812 may include more engines 814 than shown. The engines 814 are carried by wings 816 of the aircraft 810. In other embodiments, the engines 814 may be carried by a fuselage 818 and/or an empennage 820. The empennage 820 may also support horizontal stabilizers 822 and a vertical stabilizer 824.

The fuselage 818 of the aircraft 810 defines an internal cabin (such as the cabin 102 shown in FIG. 1), which includes a cockpit, one or more work sections (for example, galleys, personnel carry-on baggage areas, and the like), one or more passenger sections (for example, first class, business class, and coach sections), and an aft section. Each of the sections may be separated by a cabin transition area, which may include one or more class/section divider assemblies, as described herein. The aircraft 810 may include or be used in conjunction with one or more robot systems, such as shown and described with respect to FIGS. 1-4.

Alternatively, instead of an aircraft, embodiments of the present disclosure may be used with various other vehicles, such as automobiles, buses, locomotives and train cars, seacraft, spacecraft, and the like.

Figure 6A:
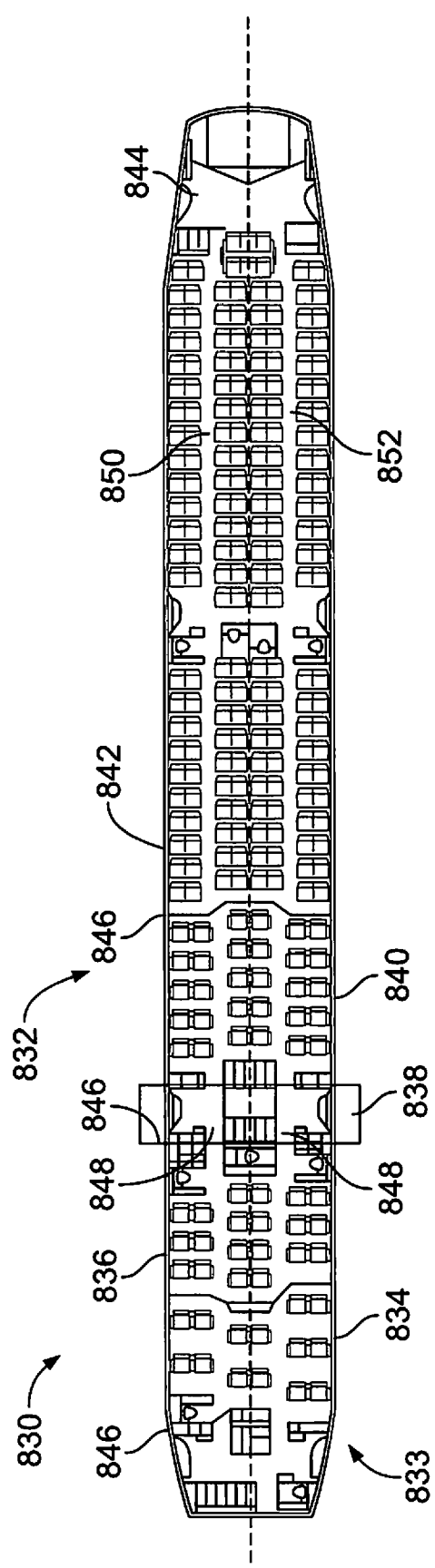
FIG. 6A illustrates a top plan view of an internal cabin of an aircraft, according to an embodiment of the present disclosure.

FIG. 6A illustrates a top plan view of an internal cabin 830 of an aircraft, according to an embodiment of the present disclosure. The internal cabin 830 may be within a fuselage 832 of the aircraft 810, shown in FIG. 5. For example, one or more fuselage walls may define the internal cabin 830. The internal cabin 830 includes multiple sections, including a front section 833, a first class section 834, a business class section 836, a front galley station 838, an expanded economy or coach section 840, a standard economy or coach section 842, and an aft section 844, which may include multiple lavatories and galley stations. It is to be understood that the internal cabin 830 may include more or less sections than shown. For example, the internal cabin 830 may not include a first class section, and may include more or less galley stations than shown. Each of the sections may be separated by a cabin transition area 846, which may include class/section divider assemblies between aisles 848.

As shown in FIG. 6A, the internal cabin 830 includes two aisles 850 and 852 that lead to the aft section 844. Optionally, the internal cabin 830 may have less or more aisles than shown. For example, the internal cabin 830 may include a single aisle that extends through the center of the internal cabin 830 that leads to the aft section 844. The internal cabin 830 may include or be used in conjunction with one or more robot systems, such as shown and described with respect to FIGS. 1-4.

Figure 6B:
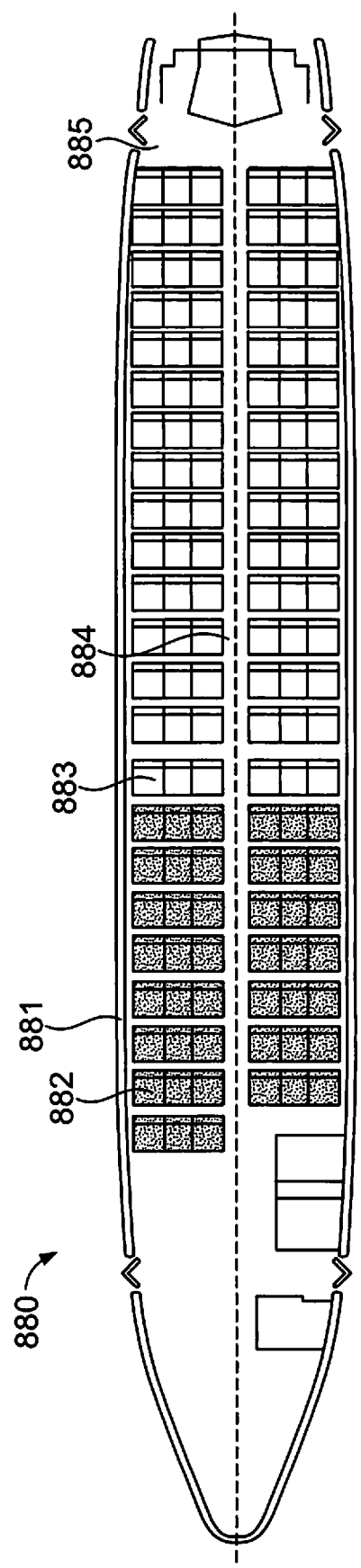
FIG. 6B illustrates a top plan view of an internal cabin of an aircraft, according to an embodiment of the present disclosure.

FIG. 6B illustrates a top plan view of an internal cabin 880 of an aircraft, according to an embodiment of the present disclosure. The internal cabin 880 may be within a fuselage 881 of the aircraft 810, shown in FIG. 4. For example, one or more fuselage walls may define the internal cabin 880. The internal cabin 880 includes multiple sections, including a main cabin 882 having passenger seats 883, and an aft section 885 behind the main cabin 882. It is to be understood that the internal cabin 880 may include more or less sections than shown.

The internal cabin 880 may include a single aisle 884 that leads to the aft section 885. The single aisle 884 may extend through the center of the internal cabin 880 that leads to the aft section 885. For example, the single aisle 884 may be coaxially aligned with a central longitudinal plane of the internal cabin 880. The internal cabin 880 may include or be used in conjunction with one or more robot systems, such as shown and described with respect to FIGS. 1-4.

Different examples of the apparatus(es) and method(s) disclosed herein include a variety of components, features, and functionalities. It should be understood that the various examples of the apparatus(es) and method(s) disclosed herein may include any of the components, features, and functionalities of any of the other examples of the apparatus(es) and method(s) disclosed herein in any combination, and all of such possibilities are intended to be within the spirit and scope of the present disclosure.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the various embodiments of the disclosure without departing from their scope. While the dimensions and types of materials described herein are intended to define the parameters of the various embodiments of the disclosure, the embodiments are by no means limiting and are exemplary embodiments. Many other embodiments will be apparent to those of skill in the art upon reviewing the above description. The scope of the various embodiments of the disclosure should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various embodiments of the disclosure, including the best mode, and also to enable any person skilled in the art to practice the various embodiments of the disclosure, including making and using any devices or systems and performing any incorporated methods. The patentable scope of the various embodiments of the disclosure is defined by the claims, and may include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A robot system configured for use on-board a vehicle during a trip of the vehicle, the vehicle including a cabin having a usage area and a storage area, the robot system including:
   a body;
   a transportation system coupled to the body and configured to move the body through at least a portion of the cabin during at least a portion of the trip, the transportation system comprising at least one of a drive or guides;
   a communication link configured to autonomously receive trip information from off-board the vehicle during the trip, the trip information corresponding to one or more of trip status, trip performance, passenger information, crew information, or related trip information;

an interaction system configured to interact with at least one of a passenger or a crew member disposed within the cabin during trip, the interaction system comprising at least one of a microphone, touch screen, speaker, or projector; and a control system comprising a memory that stores instructions for directing the control system to autonomously operate the robot system to perform a crew assistance task during the use of the vehicle responsive to the trip information.

2. The robot system of claim 1, wherein the transportation system comprises a gyroscopic ball configured for rolling the robot system along a floor of the cabin.

3. The robot system of claim 1, wherein the transportation system is configured to cooperate with a track network disposed in the cabin.

4. The robot system of claim 3, wherein the track network is disposed on a ceiling of the cabin, and the body is configured to travel along the ceiling.

5. The robot system of claim 1, wherein the control system is configured to secure the robot system in place during at least a portion of the trip.

6. The robot system of claim 5, wherein the control system is configured to autonomously secure the robot system in place responsive to the trip information.

7. The robot system of claim 5, further comprising a magnet, wherein the control system is configured to secure the robot system in place using the magnet in cooperation with a magnetic portion of a floor of the cabin in the usage area.

8. The robot system of claim 5, wherein the control system is configured to autonomously secure the robot system in place in the storage area during at least one of take-off or landing.

9. The robot system of claim 1, further comprising a passenger sensor, wherein the control system is configured to control the robot system responsive to an input received via the passenger sensor.

10. The robot system of claim 1, wherein the robot system is configured to autonomously display a trip announcement corresponding to the trip information responsive to receiving the trip information.

11. The robot system of claim 1, wherein the interaction system is configured to provide a holographic projection display.

12. The robot system of claim 1, wherein the body is configured to be compressible between an expanded state and a compressed state.

13. A robot system configured for use on-board a vehicle during a trip, the vehicle including a cabin, the robot system including:
 a body;
 a transportation system coupled to the body and configured to move the body through at least a portion of the cabin, the transportation system comprising at least one of a drive or guides;
 an interaction system configured to interact with at least one of a passenger or a crew member disposed within the cabin during the trip, the interaction system comprising at least one of a microphone, touch screen, speaker, or projector; and
 a control system comprising a memory that stores instructions for directing the control system to operate the robot system to autonomously perform a medical crew assistance task during the trip responsive to remote information acquired from a source disposed remote from the vehicle during the trip, wherein the robot system implements a course of action provided by the source disposed remote from the vehicle.

14. The robot system of claim 13, wherein the robot system is configured to provide guidance corresponding to the medical crew assistance task with the interaction system.

15. The robot system of claim 13, further comprising a communication link configured to operably couple the robot system with a ground communication system, wherein the robot system is configured to collect medical information of the passenger and to provide the medical information to off-board medical personnel using the communication link.

16. The robot system of claim 15, further comprising a passenger sensor configured to acquire medical information of a passenger during the trip.

17. The robot system of claim 15, wherein the robot system is configured to receive guidance from the off-board medical personnel via the communication link, and to perform the medical crew assistance task responsive to receiving the guidance.

18. A robot system configured for use on-board a vehicle during a trip, the vehicle including a cabin having a usage area and a storage area, the robot system including:
 a body having a receptacle therein for containing trash;
 a transportation system coupled to the body and configured to move the body through at least a portion of the cabin, the transportation system comprising at least one of a drive or guides;
 a communication link configured to receive trip information from off-board the vehicle during the trip, the trip information corresponding to one or more of trip status, trip performance, passenger information, crew information, or related trip information;
 an interaction system configured to interact with at least one of a passenger or a crew member disposed within the cabin during the trip, the interaction system comprising at least one of a microphone, touch screen, speaker, or projector; and
 a control system comprising a memory that stores instructions for directing the control system to autonomously operate the robot system to perform a trash removal task during the trip responsive to the trip information.

19. The robot system of claim 18 further comprising a compactor disposed within the body and configured to compress trash disposed in the receptacle.

20. The robot system of claim 18, wherein the control system is configured to operate the robot to perform the trash removal task responsive to the trip status.

* * * * *